United States Patent
Wakisaka et al.

(10) Patent No.: US 9,310,114 B2
(45) Date of Patent: Apr. 12, 2016

(54) ELECTRONIC EXPANSION VALVE AND AIR CONDITIONER PROVIDED WITH ELECTRONIC EXPANSION VALVE

(71) Applicant: DAIKIN INDUSTRIES, LTD., Osaka-shi, Osaka (JP)

(72) Inventors: Shigetaka Wakisaka, Sakai (JP); Masahiro Oka, Sakai (JP)

(73) Assignee: Daiken Industries, Ltd., Osaka (JP)

( * ) Notice: Subject to any disclaimer, the term of this patent is extended or adjusted under 35 U.S.C. 154(b) by 25 days.

(21) Appl. No.: 14/368,024

(22) PCT Filed: Dec. 4, 2012

(86) PCT No.: PCT/JP2012/081325
§ 371 (c)(1),
(2) Date: Jun. 23, 2014

(87) PCT Pub. No.: WO2013/103061
PCT Pub. Date: Jul. 11, 2013

(65) Prior Publication Data
US 2015/0020540 A1     Jan. 22, 2015

(30) Foreign Application Priority Data
Jan. 4, 2012   (JP) ................................. 2012-000261

(51) Int. Cl.
| *F25B 41/00* | (2006.01) |
| *F16K 37/00* | (2006.01) |
| *F25B 41/06* | (2006.01) |
| *F16K 31/04* | (2006.01) |
| *F25B 13/00* | (2006.01) |

(52) U.S. Cl.
CPC ............... *F25B 41/062* (2013.01); *F16K 31/04* (2013.01); *F16K 37/0075* (2013.01); *F25B 13/00* (2013.01); *F25B 2313/0314* (2013.01); *F25B 2341/0653* (2013.01); *F25B 2700/1931* (2013.01); *Y02B 30/72* (2013.01)

(58) Field of Classification Search
CPC ........... F25B 41/062; F25B 2313/0314; F25B 2341/065; F25B 2341/0653; F16K 31/04; F16K 37/0075
USPC ....................................................... 236/92 B
See application file for complete search history.

(56) References Cited

U.S. PATENT DOCUMENTS

| 2009/0020716 A1 | 1/2009 | Hokazono et al. |
| 2010/0000244 A1 | 1/2010 | Kawakatsu et al. |

FOREIGN PATENT DOCUMENTS

| CN | 2703169 Y | 6/2005 |
| CN | 2786597 Y | 6/2006 |
| EP | 1087158 A1 | 3/2001 |
| GB | 2265228 A | 9/1993 |
| GB | 2 305 744 A | 4/1997 |
| JP | 6-265222 A | 9/1994 |
| JP | 9-96452 A | 4/1997 |
| JP | 2001-194029 A | 7/2001 |
| JP | 2009-68744 A | 4/2009 |
| JP | 2011-255330 A | 12/2011 |

*Primary Examiner* — Marc Norman
(74) *Attorney, Agent, or Firm* — Birch, Stewart, Kolasch & Birch, LLP

(57) ABSTRACT

An electronic expansion valve is provided that allows an air conditioner to control air conditioning in accordance with a valve opening point of the electronic expansion valve. Also, an air conditioner is provided that is capable of controlling air conditioning on the basis of the valve opening point of the electronic expansion valve. The electronic expansion valve is provided with a barcode corresponding to property data of the electronic expansion valve. The property data include a pulse number corresponding to a valve opening point that was measured in the process of manufacturing the electronic expansion valve. The valve opening point is set on the basis of the pulse number of a stepper motor when the flow rate of a gas flowing through a valve hole of the electronic expansion valve is equal to a set value.

4 Claims, 4 Drawing Sheets

ELECTRONIC EXPANSION VALVE AND AIR CONDITIONER PROVIDED WITH ELECTRONIC EXPANSION VALVE

TECHNICAL FIELD

The present invention relates to an electronic expansion valve that is selectively opened and closed by moving a valve member using a stepper motor and to an air conditioner having the electronic expansion valve.

BACKGROUND ART

The valve opening point, at which an electronic expansion valve is switched from the closed state to the open state, varies from one electronic expansion valve to another. Such variation is caused by variations in the manner in which a stepper motor is installed and variations in the dimensions of valve members and valve seats.

Such varied valve opening points of electronic expansion valves cause variation in performance of air conditioners. Even in the same type of air conditioners having refrigerant circuits controlled according to a common control program, valve opening points of electronic expansion valves installed in the air conditioners generally vary from one product to another. As a result, even when the same pulse control is performed on the electronic expansion valves, the respective electronic expansion valves bring about varied refrigerant flow rates. This causes an inappropriate refrigerant flow rate in some air conditioners, thus destabilizing air conditioning.

To decrease the number of unstably operating air conditioners, air conditioning by respective air conditioners must be controlled based on the valve opening point of the electronic expansion valve, which is installed in each of the air conditioners.

Accordingly, as described in Patent Document 1, to accurately obtain the valve opening point of an electronic expansion valve installed in an air conditioner, the valve opening point of the electronic expansion valve is measured. Specifically, the temperature of the heat exchanger installed in an indoor unit of the air conditioner is detected and, meanwhile, the pulse number input to the stepper motor of the electronic expansion valve is increased in a stepwise manner. Then, the valve opening point is set based on the pulse number at the time when the temperature of the heat exchanger of the indoor unit decreases by an amount greater than or equal to a predetermined amount.

To accurately measure the valve opening point, the temperature in the environment surrounding the refrigerant circuit must be maintained constant throughout a measuring period. In other words, the ambient temperature of the indoor heat exchanger and the ambient temperature of an outdoor heat exchanger must be maintained unchanged for a predetermined period of time. However, when the air conditioner is in operation, the ambient temperatures of the indoor and outdoor heat exchangers are substantially impossible to maintain constant. This hampers accurate measurement of the valve opening point and thus makes it difficult for the air conditioner to perform appropriate air conditioning control in accordance with the valve opening point of the electronic expansion valve. As a result, an electronic expansion valve capable of allowing such appropriate air conditioning control is demanded.

PRIOR ART DOCUMENTS

Patent Documents

Patent Document 1: Japanese Laid-Open Patent Publication No. 2009-68744

SUMMARY OF THE INVENTION

Problems that the Invention is to Solve

Accordingly, it is an objective of the present invention to provide an electronic expansion valve allowing an air conditioner to perform air conditioning in accordance with the valve opening point of the electronic expansion valve and an air conditioner capable of carrying out air conditioning control based on the valve opening point of the electronic expansion valve.

Means for Solving the Problems

In accordance with a first aspect of the present invention, an electronic expansion valve is provided that includes a first refrigerant pipe, a second refrigerant pipe, a valve body, a valve member, and a stepper motor. The valve body has a valve chamber connected to the first refrigerant pipe and a valve hole connecting the valve chamber to the second refrigerant pipe. The valve member has a valve portion inserted into the valve hole of the valve body. The valve member is movable to selectively open and close the valve hole of the valve body with the valve portion. The valve member is configured such that, when the valve member moves, the distance between an inner wall surface of the valve hole of the valve body and the valve portion of the valve member changes. The stepper motor moves the valve member in accordance with a pulse number input to the stepper motor. A valve opening point is set based on the pulse number of the stepper motor at the time when the flow rate of fluid flowing through the valve hole is equal to a set value. A pulse number corresponding to the valve opening point is measured in a process of manufacturing the electronic expansion valve. An identifier is provided that corresponds to characteristic data of the electronic expansion valve containing the measured pulse number.

The electronic expansion valve has an identifier corresponding to the characteristic data of the electronic expansion valve containing the pulse number at the valve opening point. This allows the air conditioner to perform control in accordance with the valve opening point of the electronic expansion valve.

The set value is preferably greater than or equal to a maximum allowable value of the flow rate of the fluid that is allowed to pass through the second refrigerant pipe at the time when the valve hole of the valve body is closed by the valve portion.

This configuration facilitates measurement of the pulse number corresponding to the valve opening point.

In accordance with another aspect of the present invention, an air conditioner is provided that includes the above described electronic expansion valve. The valve opening point of the electronic expansion valve is memorized, and the electronic expansion valve based on the valve opening point is controlled.

The air conditioner controls the electronic expansion valve based on the valve opening point obtained in the manufacturing process. An appropriate refrigerant flow rate is thus ensured. Also, an air conditioner capable of stably controlling air conditioning is provided.

Effects of the Invention

According to the present invention, an electronic expansion valve allowing an air conditioner to control air conditioning in accordance with the valve opening point of the electronic expansion valve is provided. Also, an air conditioner capable of controlling air conditioning based on the valve opening point of the electronic expansion valve is provided.

MODES FOR CARRYING OUT THE INVENTION

Figure 1:
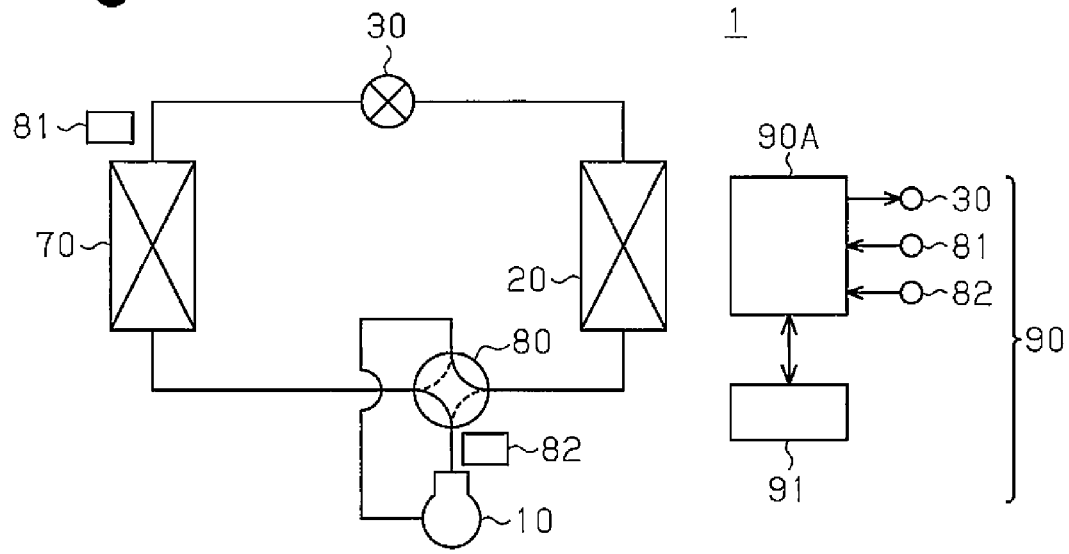
FIG. 1 is a diagram representing the configuration of an air conditioner according to one embodiment of the present invention as a whole.

An air conditioner according to an embodiment of the present invention will now be described with reference to FIG. 1.

An air conditioner 1 for conditioning indoor air includes a compressor 10 for compressing refrigerant, an outdoor heat exchanger 20 placed outdoors, an electronic expansion valve 30 for expanding refrigerant, an indoor heat exchanger 70 arranged indoors, a four-way switch valve 80, and a controller 90 for controlling the electronic expansion valve 30.

The controller 90 has a control circuit 90A and a memory 91 for storing data representing characteristics of the electronic expansion valve 30. The memory 91 is configured by, for example, an electronically erasable and programmable read only memory (EEPROM), which is rewritable.

A temperature sensor 81 and a pressure sensor 82 are connected to the control circuit 90A. The temperature sensor 81 detects the temperature of refrigerant (hereinafter, the refrigerant temperature) and outputs a refrigerant temperature signal, which corresponds to the refrigerant temperature, to the control circuit 90A. The pressure sensor 82 detects the pressure of the refrigerant (hereinafter, the refrigerant pressure) and outputs a refrigerant pressure signal, which corresponds to the refrigerant pressure, to the control circuit 90A.

Figure 2:
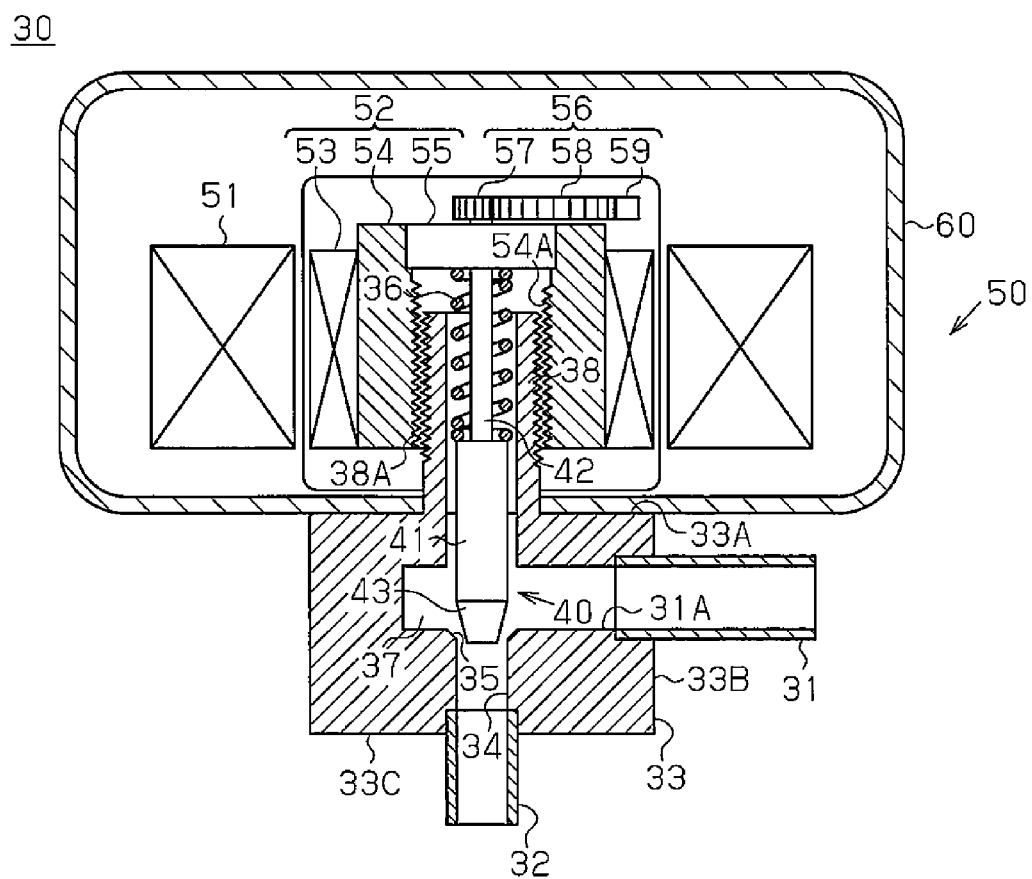
FIG. 2 is a cross-sectional view showing an electronic expansion valve according to the embodiment illustrated in FIG. 1.

The electronic expansion valve 30 will hereafter be described with reference to FIG. 2.

The electronic expansion valve 30 includes a first refrigerant pipe 31, a second refrigerant pipe 32, a valve body 33 to which the first refrigerant pipe 31 and the second refrigerant pipe 32 are connected, a bar-like valve member 40, and a stepper motor 50 for moving the valve member 40 in the axial direction of the valve member 40.

The valve body 33 is columnar and has a first surface 33A and a second surface 33C, which are formed at opposite ends of the valve body 33 and extend perpendicular to the axis of the valve body 33, and a circumferential surface 33B. A guide cylinder 38 projects from the first surface 33A and extends in the axial direction of the valve body 33. The valve member 40 is movably received in the guide cylinder 38. An external threaded portion 38A is formed on the outer circumferential surface of the guide cylinder 38. A coil spring 36 is arranged between the guide cylinder 38 and the valve member 40.

The first refrigerant pipe 31 is connected to the circumferential surface 33B of the valve body 33. The second refrigerant pipe 32 is connected to the second surface 33C of the valve body 33. A valve chamber 37 is formed in the valve body 33.

The first refrigerant pipe 31 is connected to the valve chamber 37 through a communication hole 31A, which is formed in the valve body 33. The second refrigerant pipe 32 is connected to the valve chamber 37 through a valve hole 34, which is formed in the valve body 33. The inner wall surface of the valve hole 34 includes a tapered portion formed on the boundary between the valve chamber 37 and the valve hole 34. The inner diameter of the tapered portion becomes greater from the valve hole 34 toward the valve chamber 37. The tapered portion thus configures a valve seat 35. The valve hole 34, the guide cylinder 38, and the valve member 40 extend coaxial to one another. The valve member 40 is movable toward the valve hole 34 through the guide cylinder 38 and the valve chamber 37.

The valve member 40 includes a main portion 41 extending in the axial direction of the valve member 40, a support rod 42 projecting from an end of the main portion 41, and a valve portion 43 extended from the opposite end of the main portion 41. The main portion 41 and the valve portion 43 are formed as an integral body.

The main portion 41 is supported by the support rod 42 such that the main portion 41 is movable relative to the support rod 42 in the axial direction of the valve member 40 and prohibited from separating from the support rod 42. The coil spring 36 urges the main portion 41 toward the valve hole 34. The main portion 41 and the support rod 42 are received in the guide cylinder 38. The valve portion 43 is arranged in the valve chamber 37 to form a variable restricting portion between the valve portion 43 and the valve seat 35. In other words, by moving the valve member 40, the distance between the inner wall surface of the valve hole 34 of the valve body 33 and the valve portion 43 is varied. The valve portion 43 is shaped like a truncated cone.

The stepper motor 50 includes a stator 51, a rotor 52, a stopper mechanism 56 for stopping rotation of the rotor 52 at a mechanically determined reference position, and a case 60 for accommodating the stator 51, the rotor 52, and the stopper mechanism 56. The stator 51 is configured by an electromagnetic coil. The rotor 52 includes a permanent magnet 53, a rotor body 54, to which the permanent magnet 53 is fixed, and a fixing portion 55, to which the support rod 42 of the valve member 40 is attached. The valve body 33 is fixed to the case 60.

The rotor body 54 has a cylindrical shape. The guide cylinder 38 is inserted through the rotor body 54. An internal threaded portion 54A is formed in the inner circumferential surface of the rotor body 54 and meshed with the external threaded portion 38A of the guide cylinder 38.

The permanent magnet 53 is attached to the outer circumferential surface of the rotor body 54 and faces the stator 51.

The fixing portion 55 is attached to the corresponding end of the rotor body 54. An end of the coil spring 36 is held in contact with the inner side of the fixing portion 55. The opposite end of the coil spring 36 is held in contact with an end surface of the main portion 41 of the valve member 40.

Figure 3:
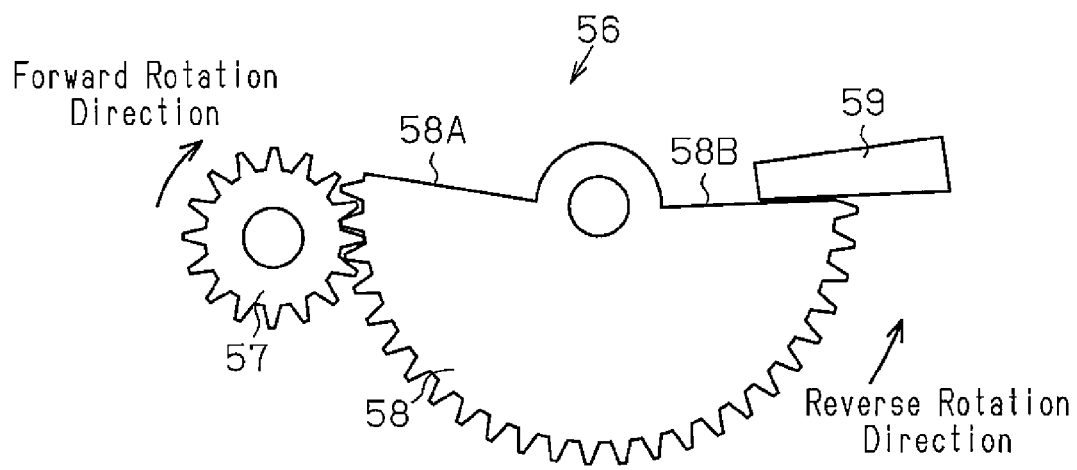
FIG. 3 is a plan view showing a stopper mechanism of the electronic expansion valve of the embodiment illustrated in FIG. 1.

The stopper mechanism 56 will now be described with reference to FIG. 3.

The stopper mechanism 56 includes a first gear 57, a second gear 58 meshed with the first gear 57, and a stopper 59 for stopping rotation of the second gear 58. The first gear 57 extends coaxial with the support rod 42 of the valve member 40 and is rotational integrally with the rotor 52. As viewed from above, the second gear 58 has an arcuate shape. The outer diameter of the second gear 58 is greater than the outer diameter of the first gear 57. The second gear 58 has an end surface 58A and an end surface 58B, each of which extends in a radial direction of the second gear 58. The second gear 58 is rotationally supported by the case 60 with a non-illustrated support mechanism. The stopper 59 is fixed to the case 60 with a non-illustrated fixation member. When the second gear 58 is rotated counterclockwise to a maximum angle as viewed in FIG. 3, the end surface 58B of the second gear 58 is in contact with the stopper 59.

Operation of the valve member 40 through activation of the stepper motor 50 will hereafter be described with reference to FIGS. 2 and 3.

When the rotor 52 of the stepper motor 50 rotates in a forward direction, engagement between the external threaded portion 38A and the internal threaded portion 54A moves the rotor 52 and the valve member 40 toward the valve body 33. In other words, the valve portion 43 of the valve member 40 moves toward the valve seat 35.

As the distal end of the valve portion 43 enters the valve hole 34 and the valve member 40 continuously proceeds toward the valve hole 34, the conical surface of the valve portion 43 contacts the valve seat 35 of the valve hole 34. In this state, the valve hole 34 is closed by the valve member 40. In this manner, the valve portion 43 moving into the valve hole 34 decreases the size of the gap between the valve portion 43 of the valve member 40 and the valve seat 35.

When the rotor 52 of the stepper motor 50 rotates in a reverse direction, engagement between the external threaded portion 38A and the internal threaded portion 54A moves the rotor 52 and the valve member 40 away from the valve body 33. In other words, the distance between the valve portion 43 of the valve member 40 and the valve seat 35 increases.

Operation of the stopper mechanism 56 will hereafter be described.

Hereinafter, the position where the valve member 40 is located at the time when the valve portion 43 contacts the valve seat 35 will be referred to as a contact position. When the valve member 40 is arranged at the contact position, the distance between the valve portion 43 and the valve seat 35 (hereinafter, the restricting portion separation distance) is 0.

When the valve member 40 moves toward the valve hole 34, the first gear 57 rotates in the forward direction and the second gear 58 rotates in the reverse direction. When the valve member 40 reaches the contact position, a gap exists between the end surface 58B of the second gear 58 and the stopper 59. That is, the second gear 58 is separated from the stopper 59.

When the valve member 40 is located at the contact position and the rotor 52 rotates continuously in the forward direction, the coil spring 36, which is arranged between the valve member 40 and the fixing portion 55, is contracted. This applies force to the zone between the valve portion 43 and the valve seat 35 by intensity corresponding to the contraction distance of the coil spring 36. In this state, as the rotor 52 continuously rotates in the forward direction toward a predetermined angular rotation position, the end surface 58B of the second gear 58 contacts the stopper 59. Rotation of the rotor 52 is thus restricted.

Figure 4:
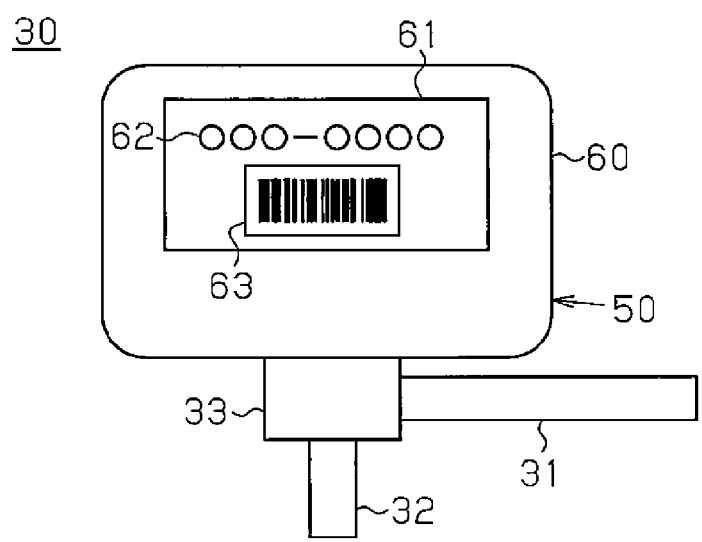
FIG. 4 is a view showing the appearance of the electronic expansion valve of the embodiment illustrated in FIG. 1.

The electronic expansion valve 30 has the appearance described below with reference to FIG. 4.

The case 60 of the stepper motor 50 has a label 61, which represents an ID number 62 and a barcode 63 of the electronic expansion valve 30.

The ID number 62 is provided to each individual electronic expansion valve 30. In other words, electronic expansion valves 30 have different ID numbers 62. The barcode 63 is an identifier corresponding to a measured value of a valve opening point of the associated electronic expansion valve 30 (hereinafter, valve opening point data), to which the label 61 is applied. The valve opening point is set based on the pulse number at the time when the valve portion 43 and the valve seat 35 start to separate from each other.

The stepper motor 50 is controlled in the manner described below.

The relationship between the pulse signal and the pulse number that are input to the stepper motor 50 will hereafter be described.

The stepper motor 50 rotates the rotor 52 based on the pulse signal provided by the control circuit 90A. The pulse signal includes a pulse signal for forward rotation and a pulse signal for reverse rotation.

The pulse signal for forward rotation causes the rotor 52 to rotate in the forward direction through a predetermined mode of excitation. Forward rotation of the rotor 52 moves the valve member 40 toward the valve hole 34.

The pulse signal for reverse rotation causes the rotor 52 to rotate in the reverse direction through a predetermined mode of excitation. Reverse rotation of the rotor 52 moves the valve member 40 away from the valve hole 34.

Specifically, in response to the pulse signal for forward rotation, the rotor 52 rotates in the forward direction by the rotation angle corresponding to the number of the pulses in the pulse signal. This moves the valve member 40 toward the valve hole 34 by the distance corresponding to the rotation angle. In response to the pulse signal for reverse direction, the rotor 52 rotates in the reverse direction by the rotation angle corresponding to the number of the pulses in the pulse signal. This moves the valve member 40 away from the valve hole 34 by the distance corresponding to the rotation angle.

When the rotor 52 is in a state prohibited from rotating in the forward direction by the stopper mechanism 56 (hereinafter, a contact stop state), the pulse number is set to 0, which is the initial value. Such resetting of the pulse number is carried out when the air conditioner 1 is started, for example.

In response to the pulse signal for reverse rotation, the value obtained by adding the number of the pulses in the pulse signal to the pulse number corresponding to the current angular rotation position of the rotor 52 is set as an updated pulse number. In response to the pulse signal for forward rotation, the value obtained by subtracting the number of the pulses in the pulse signal from the pulse number corresponding to the current angular rotation position of the rotor 52 is set as an updated pulse number. In other words, the accumulation of the numbers of the pulses in the respective pulse signals input to the stepper motor 50 is used as the pulse number.

Figure 5:
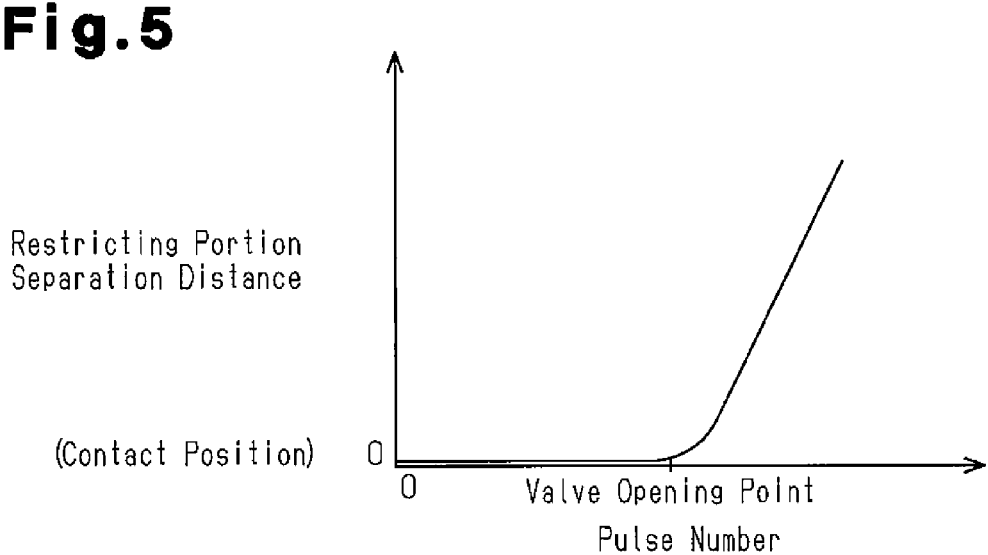
FIG. 5 is a graph representing relationship between the pulse number and the restricting portion separation distance of the electronic expansion valve of the embodiment illustrated in FIG. 1.

The relationship between the pulse number of the stepper motor 50 and the restricting portion separation distance (the distance between the valve portion 43 and the valve seat 35) will hereafter be described with reference to FIG. 5.

When the pulse number is 0, the valve portion 43 is in contact with the valve seat 35 and the restricting portion separation distance is substantially equal to 0. Also, when the pulse number is in the range from 0 to the pulse number corresponding to the valve opening point, the valve portion 43 is in contact with the valve seat 35 and the restricting portion separation distance is substantially equal to 0.

If the pulse number exceeds the pulse number corresponding to the valve opening point, the restricting portion separation distance increases in accordance with increase of the pulse number. Referring to FIG. 5, the increase of the pulse number and the restricting portion separation distance are substantially proportional to each other with respect to the pulse number corresponding to the valve opening point, which is defined as the starting point.

Figure 6:
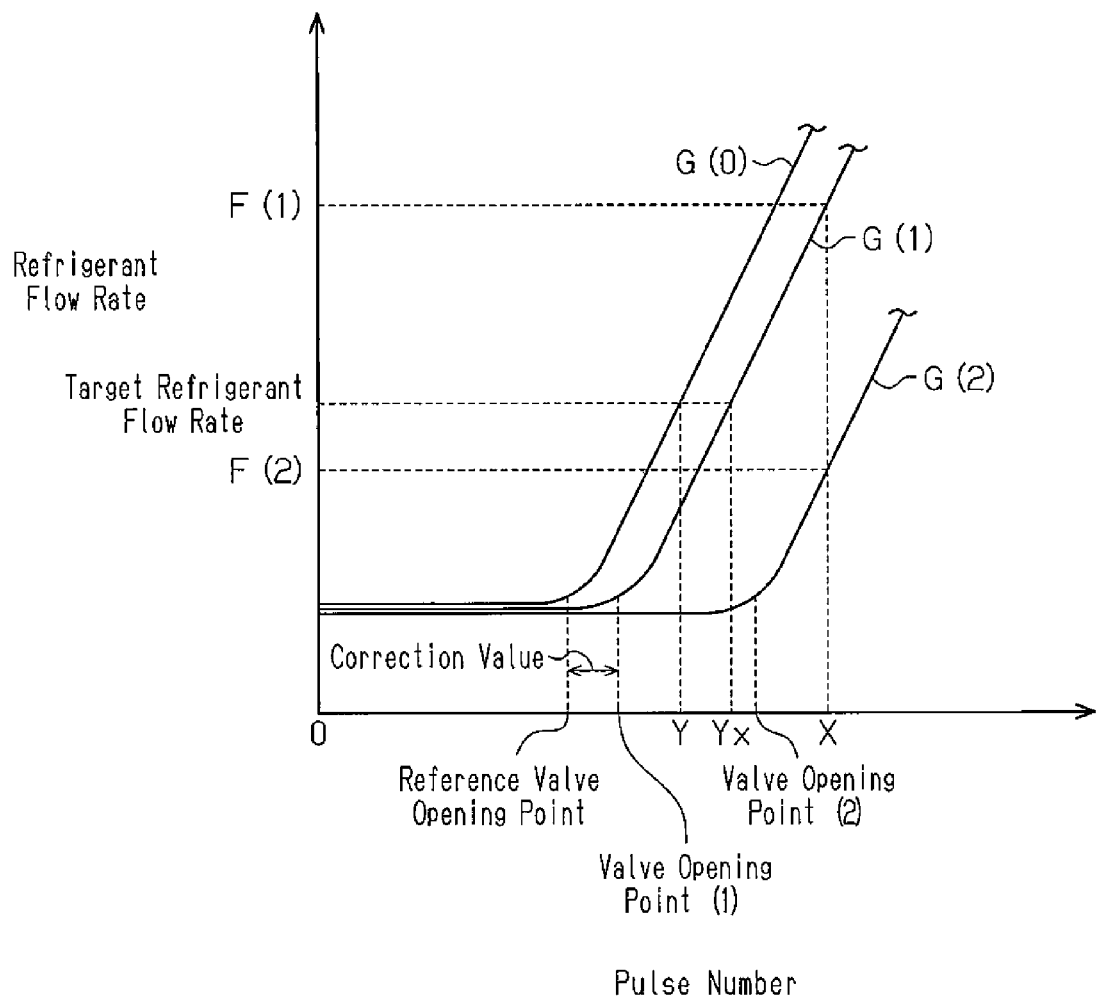
FIG. 6 is a graph representing relationship between the pulse number and the refrigerant flow rate of the electronic expansion valve of the embodiment illustrated in FIG. 1.

With reference to FIG. 6, the relationship between the refrigerant flow rate and the valve opening point in two electronic expansion valves 30 will now be described. A curve G(1) in FIG. 6 represents characteristics of a first electronic expansion valve 30 and a curve G(2) in the graph represents characteristics of a second electronic expansion valve 30.

When the pulse number, which is shown along the axis of abscissas in FIG. 6, is smaller than the pulse number corresponding to the valve opening point, the valve portion 43 and the valve seat 35 are held in a contact state (hereinafter, a closed state). In the closed state, there is a slight gap between the valve portion 43 and the valve seat 35 so that a slight amount of refrigerant flows between the first and second refrigerant pipes 31, 32. In this state, the flow rate of the refrigerant is substantially constant regardless of the pulse number. In contrast, when the pulse number is greater than the pulse number corresponding to the valve opening point, the valve portion 43 is separated from the valve seat 35 and the refrigerant flow rate increases in correspondence with the increase of the pulse number.

As shown in FIG. 6, the electronic expansion valves 30 have different valve opening points for the reason described below.

Specifically, there is variation in dimensions, assembly errors, and variation in physical properties of the components configuring the electronic expansion valves 30 from one electronic expansion valve 30 to another. This causes variation from one electronic expansion valve 30 to another in the angular difference between the rotation angle of the rotor 52 at the time after the valve portion 43 moves toward the valve hole 34 and thus contacts the valve seat 35 and the rotation angle of the rotor 52 at the time when the rotor 52 is in the contact stop state. As a result, the electronic expansion valves 30 have different valve opening points.

The above-described variation in dimensions includes variation in the dimensions of the valve member 40, variation in inclination of the conical surface of the valve portion 43, variation in inclination of the tapered portion of the valve seat 35, and variation in the length of the coil spring 36. The assembly errors include errors in assembly of the first gear 57, the second gear 58, and the stopper 59 and errors of assembly of the valve member 40 with the fixing portion 55. The variation in physical properties includes variation in the constant of spring of the coil spring 36 and variation in the torque of the stepper motor 50.

The variation in the valve opening points of the electronic expansion valves 30 causes the problem described below.

To control the refrigerant flow rate, the restricting portion separation distance is controlled in correspondence with the pulse number. In other words, by selectively increasing and decreasing the pulse number, the restricting portion separation distance is varied to control the refrigerant flow rate.

Specifically, the refrigerant flow rate is controlled with reference to a control map that represents the relationship between the pulse number and the refrigerant flow rate. However, if the same control map is used to control the electronic expansion valves 30, the variation in the valve opening points of the electronic expansion valves 30, each of which is installed in an air conditioner 1, causes different refrigerant flow rates. Particularly, when a desired refrigerant flow rate is relatively small, the refrigerant flow rates brought about by the electronic expansion valves 30 vary to a great extent. In other words, with reference to FIG. 6, when the refrigerant flow rate is controlled with the valve member 40 in a state close to the valve opening point and the same pulse number is provided to the electronic expansion valves 30, the refrigerant flow rates brought about by the electronic expansion valves 30 vary to a great extent from one electronic expansion valve 30 to another.

For example, referring to FIG. 6, if the first electronic expansion valve 30 and the second electronic expansion valve 30 are each controlled using the same pulse number X, the refrigerant flow rate of the first electronic expansion valve 30 is represented by F(1) and the refrigerant flow rate of the second electronic expansion valve 30 is represented by F(2).

As a result, in a period in which the air conditioner 1 is operated with a small refrigerant flow rate, air conditioning accuracy varies from one air conditioner 1 to another. For example, an electronic expansion valve 30 having a valve opening point that is outside a range that ensures appropriate use of the control map may be installed in the air conditioner 1. In this case, the air conditioner 1 excessively cools or heats air. As a result, even if feedback control is carried out through the control circuit 90A, the indoor temperature cannot be stabilized to a value close to the set temperature.

Accordingly, in the illustrated embodiment, the pulse number employed in the refrigerant flow rate control is corrected based on the valve opening point of the electronic expansion valve 30. An example of a correction procedure will hereafter be described.

A curve G(0) in FIG. 6 represents an example of the control map. The valve opening point on the curve G(0) will be referred to as the reference valve opening point herein.

A target value of the refrigerant flow rate (hereinafter, a target refrigerant flow rate) is set by the control circuit 90A. At this stage, the pulse number input to the electronic expansion valve 30 (hereinafter, the commanded pulse number) is set. If the valve opening point of the electronic expansion valve 30 coincides with the reference valve opening point, the optimal pulse number for achieving the target refrigerant flow rate is set using the control map and the target air-conditioned state is brought about in a minimum time. However, generally, there is product variation from one electronic expansion valve 30 to another and the valve opening point of the electronic expansion valve 30 is varied with respect to the reference valve opening point in many cases. Accordingly, if the commanded pulse number is set for a typical electronic expansion valve 30 using the control map, the actual refrigerant flow rate does not become equal to the target refrigerant flow rate mainly for the varied valve opening points, as has been described.

Therefore, the control circuit 90A corrects the commanded pulse number based on the valve opening point of the electronic expansion valve 30. Specifically, the difference between the valve opening point of the electronic expansion valve 30 in the air conditioner 1 and the reference valve opening point is measured and set as a correction value. A corrected commanded pulse number is then calculated by adding the correction value to the original commanded pulse number. The corrected commanded pulse number is then used to control the electronic expansion valve 30.

A specific example of the correction procedure for the commanded pulse number will hereafter be described with reference to FIG. 6.

Assume that a curve G(0) represents the control map and that the installed electronic expansion valve 30 has the characteristics represented by a curve G(1). The curve G(1) includes the valve opening point (1). The change rate of the refrigerant flow rate with respect to the pulse number in the valve open state represented by the curve G(1) is substantially equal to the corresponding value represented by the curve G(0).

In this case, for the target refrigerant flow rate, the control map indicates Y as the commanded pulse number. However, the installed electronic expansion valve 30 has the characteristics represented by the curve G(1). Accordingly, if the electronic expansion valve 30 is controlled at the commanded pulse number Y, the obtained refrigerant flow rate is insufficient so that the target refrigerant flow rate cannot be achieved. Therefore, the correction value (the valve opening point (1)–the reference valve opening point) is added to the commanded pulse number Y to determine the corrected commanded pulse number Yx. The corrected commanded pulse number Yx ensures that the refrigerant flow rate of the installed electronic expansion valve 30 approximates the target refrigerant flow rate.

The above-described correction procedure of the commanded pulse number ensures that the actual refrigerant flow rate approximates the optimal refrigerant flow rate. Air conditioning is thus performed at the optimal refrigerant flow rate to improve stability of air conditioning. In the conventional technique, varied valve opening points among electronic expansion valves 30 vary stability of air conditioning control from one air conditioner 1 to another. However, such variation in the stability of air conditioning control is decreased.

Figure 7:
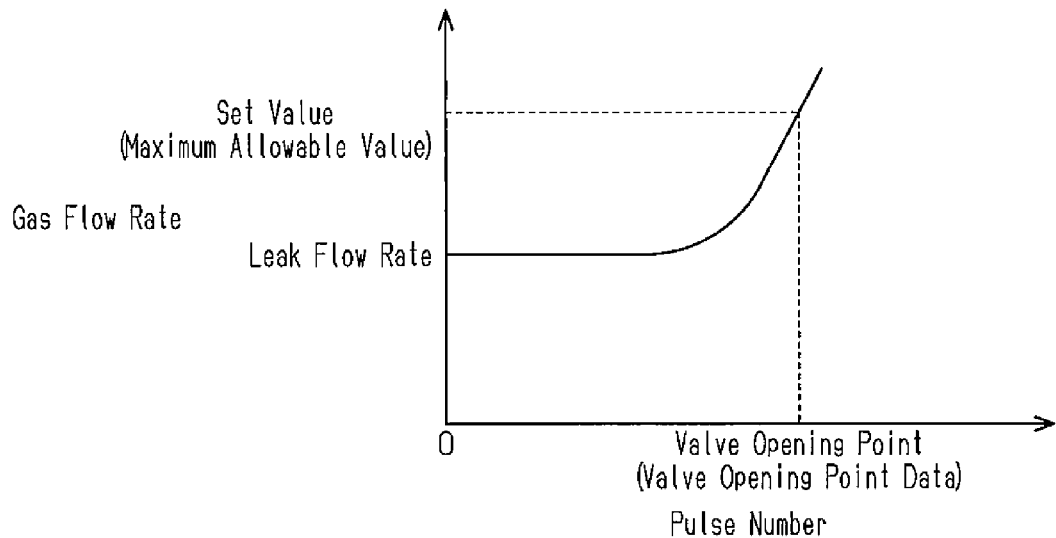
FIG. 7 is a graph representing relationship between the pulse number and the gas flow rate of the electronic expansion valve of the embodiment illustrated in FIG. 1.

With reference to FIG. 7, a method of measuring the valve opening point of the electronic expansion valve 30 will be described. In measurement, gas such as air or nitrogen gas may be employed instead of refrigerant. FIG. 7 represents the relationship between the pulse number and the gas flow rate in the range in which the gas flow rate is relatively small.

To measure the valve opening point of the electronic expansion valve 30, it is preferable that conditions for measurement are maintained unchanged for a certain period of time. Although the valve opening point may be measured when the air conditioner 1 is in operation, the ambient temperature of the indoor heat exchanger 70 and the ambient temperature of the outdoor heat exchanger 20 vary to make it difficult to maintain the measurement conditions unchanged. Accordingly, the valve opening point of the electronic expansion valve 30 is measured when the electronic expansion valve 30 is manufactured.

A specific example of a method of measuring the valve opening point will hereafter be described.

Gas is sent from the first refrigerant pipe 31 to the second refrigerant pipe 32 of the electronic expansion valve 30. The pressure, temperature and flow rates of the gas introduced into the first refrigerant pipe 31 are maintained constant throughout the period of measurement. Then, while the pulse number input to the stepper motor 50 is gradually raised from 0, the flow rate of the gas flowing in the second refrigerant pipe 32 is measured for each pulse number. When the electronic expansion valve 30 is closed, the flow rate of the gas moving in the second refrigerant pipe 32 is substantially constant regardless of the pulse number. When the valve portion 43 and the valve seat 35 are separated from each other, the flow rate of the gas flowing in the second refrigerant pipe 32 is increased. The pulse number at the time when the gas flow rate in the second refrigerant pipe 32 becomes equal to the set value is then memorized as valve opening point data (measured valve opening point). Hereinafter, the gas flow rate at the time when the electronic expansion valve 30 is closed will be referred to as the leak flow rate. The aforementioned set value is equal to the maximum allowable value of the leak flow rate. The maximum allowable value corresponds to the maximum leak rate of refrigerant that is allowed by the electronic expansion valve 30 in the closed state.

The gas flow rate is measured by means of a flow instrument such as a flowmeter. The gas flow rate may be calculated using pressure difference between the first refrigerant pipe 31 and the second refrigerant pipe 32. A method of measuring the gas flow rate is not restricted to a particular method.

The valve opening point data measured in the above-described manner is not equal to the valve opening point, in an accurate sense. However, the maximum allowable value of the leak flow rate can approximate the minimum value in the control range of the refrigerant flow rate. Accordingly, the valve opening point can be set based on the pulse number at the time when the flow rate of the gas flowing in the second refrigerant pipe 32 is equal to the maximum allowable value of the leak flow rate.

The valve opening point data is associated with the electronic expansion valve 30, which has been subjected to the measurement.

Specifically, the valve opening point data is converted to an integer through a predetermined method and encoded as barcode. The barcode 63 (the valve opening point code) is printed on the label 61, which is applied onto the case 60 of the electronic expansion valve 30. In this manner, the electronic expansion valve 30 and the valve opening point data are associated with each other on a one-to-one basis.

Effects brought about by such association between the valve opening point data and the electronic expansion valve 30 will hereafter be described.

The valve opening point data is measured in a manufacturing process in the above-described manner. At this stage, the ambient environment is maintained substantially constant and the gas introduced into the electronic expansion valve 30 is maintained under constant conditions. The valve opening point data of each electronic expansion valve 30 is thus accurately measured. The electronic expansion valve 30 and the valve opening point data are then associated specifically with each other. This allows the air conditioner 1 employing the electronic expansion valve 30 to use the valve opening point data as a parameter for refrigerant flow rate control.

The air conditioner 1, which corrects the pulse number using the valve opening point data in the refrigerant flow rate control, ensures that the refrigerant flow rate becomes an appropriate value, as has been described, thus improving stability of air conditioning control. Particularly, such improved stability is pronounced when the refrigerant flow rate is controlled in a narrow flow rate range.

Figure 8:
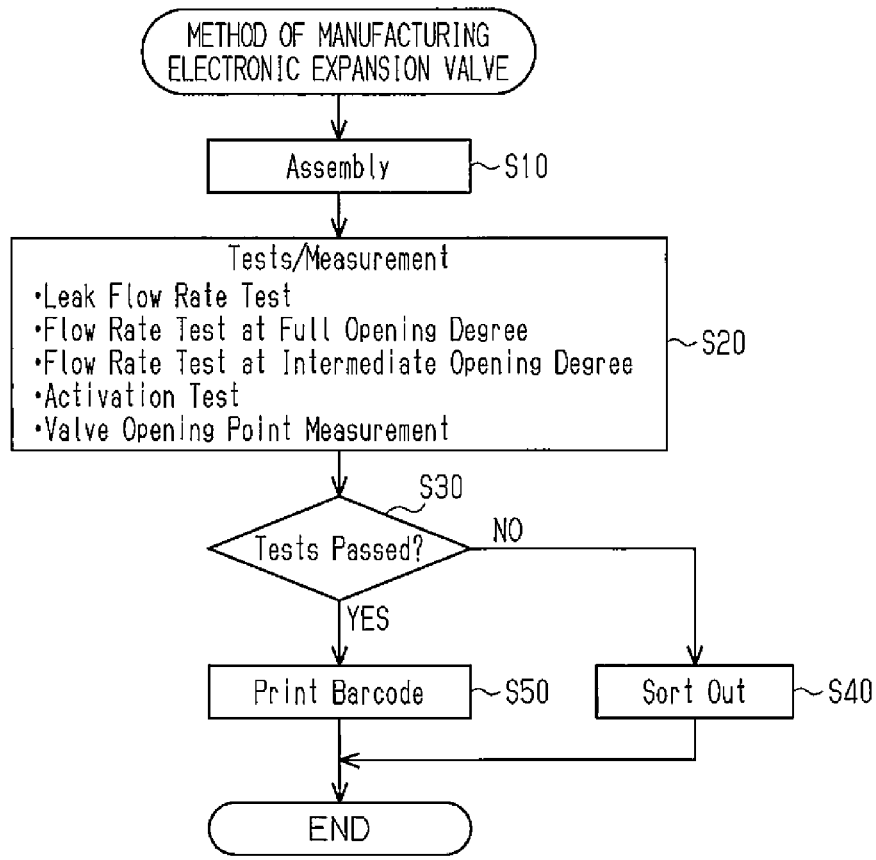
FIG. 8 is a flowchart representing a method of manufacturing the electronic expansion valve of the embodiment illustrated in FIG. 1.

Referring to FIG. 8, an example of a method of manufacturing the electronic expansion valve 30 will now be described.

In Step S10, the electronic expansion valve 30 is assembled using respective components. In Step S20, the electronic expansion valve 30 is subjected to various tests and measurement.

The tests include, for example, a leak flow rate test and flow rate tests at a full opening degree and an intermediate opening degree. An activation test is also performed. The valve opening point is measured by the same method as the above-described method.

In the leak flow rate test, the gas flow rate (the leak flow rate) at the time when the pulse number is 0 is measured to determine whether the gas flow rate is smaller than or equal to the maximum allowable value. If the gas flow rate (the leak flow rate) is greater than the maximum allowable value, the electronic expansion valve 30 is determined to be defective.

In the flow rate test at the full opening degree, the gas flow rate at the time when the pulse number is the maximum value is measured to determine whether the gas flow rate is greater than or equal to a reference value. When the gas flow rate is smaller than the reference value, the electronic expansion valve 30 is determined to be defective. The reference value is a value set in advance.

In the flow rate test at the intermediate opening degree, the gas flow rate at the time when the pulse number is an intermediate value is measured to determine whether the gas flow rate is in a set range. When the gas flow rate is outside the set range, the electronic expansion valve 30 is determined to be defective. The set range is a range between an upper limit value and a lower limit value, which are set in advance.

The activation test is performed to determine whether the stepper motor 50 is activated at a predetermined voltage. If the stepper motor 50 cannot be activated, the electronic expansion valve 30 is determined to be defective. Some defective products may be reassembled and retested.

In Step S30, those of the electronic expansion valves 30 that have passed all the tests are sorted. Those of the electronic expansion valves 30 that have been determined to be defective in any one of the tests are sorted out as defective products (Step S40). In Step S50, the barcode 63 corresponding to the valve opening point data is printed on the label 61 and the label 61 is applied onto the case 60 of the electronic expansion valve 30.

The valve opening point data represented by the label 61 is stored in the memory 91 of the air conditioner 1 in a manufacturing process of the air conditioner 1. Specifically, information represented by the barcode 63 of the label 61 applied onto the electronic expansion valve 30 is read by a reader and stored in the memory 91 as valve opening point data.

The illustrated embodiment has the advantages described below.

(1) In the illustrated embodiment, the electronic expansion valve 30 has the barcode 63 (the valve opening point code), which is an identifier corresponding to valve opening point data. The valve opening point data of the electronic expansion valve 30 is thus used by the air conditioner 1. In other words, the air conditioner 1 is allowed to perform control in correspondence with the valve opening point of the electronic expansion valve 30.

(2) In the illustrated embodiment, the set value of the gas flow rate at the time when the valve opening point is measured is equal to the maximum allowable value of the leak flow rate. As a result, the valve opening point data is easily obtained. Specifically, to accurately measure the valve opening point, it is necessary to measure the point of inflection at which the change rate of the refrigerant flow rate changes with respect to change of the pulse number. However, in the illustrated embodiment, the point of inflection does not have to be measured.

(3) In the illustrated embodiment, the air conditioner 1 memorizes the valve opening point data of the electronic expansion valve 30 in the air conditioner 1 and controls the electronic expansion valve 30 based on the valve opening point data. This decreases the frequency with which the refrigerant flow rate becomes unequal to the appropriate value. Also, the number of the air conditioners 1 exhibiting poor stability in air conditioning control is decreased.

Modified Embodiments

The present invention is not restricted to the illustrated embodiment but may be embodied as modified from the embodiment as described below. Each of the modified forms described below may be used in combination with any other one of the modified forms.

In the illustrated embodiment, the valve opening point is measured using gas introduced into the electronic expansion valve 30. However, the valve opening point may be measured by methods described below. For example, light may be introduced into one of the first refrigerant pipe 31 and the second refrigerant pipe 32 to detect the rate of the light leaking from the other one of the refrigerant pipes 31, 32. The valve opening point is set based on the pulse number at the time when the light leak rate is equal to a predetermined light rate.

Alternatively, the valve opening point of the electronic expansion valve 30 may be measured using liquid, instead of gas. Also, actually used refrigerant may be employed to measure the valve opening point. If the refrigerant is used, the difference in temperature between the first refrigerant pipe 31 and the second refrigerant pipe 32 is detected. The valve opening point is set based on the pulse number at the time when the temperature difference is equal to a predetermined temperature difference.

In the illustrated embodiment, the set value, at which the valve opening point of the electronic expansion valve 30 is measured, is equal to the maximum allowable value of the leak flow rate. However, the set value may be greater than the maximum allowable value of the leak flow rate. Even in this case, the advantage (1) is achieved.

In the illustrated embodiment, the valve opening point data of the electronic expansion valve 30 is encoded as barcode. However, data representing any suitable characteristics of the electronic expansion valve 30 other than the valve opening point may be encoded as barcode and provided to the electronic expansion valve 30. The characteristics other than the valve opening point may be, for example, the leak flow rate, the flow rate at the full opening degree, and the point of inflection of the flow rate curve. Data representing the leak flow rate is obtained in a leak flow rate test. Data representing the flow rate at the full opening degree is obtained in a flow rate test at the full opening degree. The point of inflection of the flow rate curve is set based on the pulse number at which the change rate of the refrigerant flow rate with respect to the increase rate of the pulse number increases in the flow rate curve, which represents change of the refrigerant flow rate as the pulse number increases. By encoding these types of characteristic data each as barcode, the characteristic data of the electronic expansion valve 30 in the air conditioner 1 is read out and memorized in the memory 91 of the air conditioner 1 when the air conditioner 1 is manufactured. This ensures refrigerant flow rate control using the data, thus decreasing variation in refrigerant flow rates from one electronic expansion valve 30 to another caused by variation in characteristics of the electronic expansion valves 30.

Although the valve opening point data is encoded as barcode in the illustrated embodiment, the form of the identifier is not restricted to the barcode. That is, any other suitable identifier may be employed as long as the identifier is in a form readable by predetermined means when the electronic expansion valve 30 is installed in the air conditioner 1. Specifically, the valve opening point data may be associated with the electronic expansion valve 30 in the forms described below.

As another form of encoding, the valve opening point data may be encoded as QR code (registered trademark), instead of the barcode 63. Alternatively, the value represented by the valve opening point data may be printed on the label 61. In this case, the value printed on the label 61 is read through image recognition. Also, the valve opening point data may be converted into a magnetic signal and formed as a magnetic stripe, which is applied onto the label 61. Further, the valve opening point data may be stored in an IC tag. In this case, other test results may be stored in the IC tag.

The valve opening point data may be provided in other forms as described below.

Instead of associating the valve opening point data with the electronic expansion valve 30, the valve opening point data may be associated with the ID number 62 of the electronic expansion valve 30. For example, the ID number 62 and the valve opening point data are associated with each other and memorized using a data sheet or an electronic file. When the air conditioner 1 is manufactured, the valve opening point data corresponding to the ID number 62 of the electronic expansion valve 30 is read out from the data sheet or the electronic file. This method also allows specific association between the electronic expansion valve 30 and the valve opening point data, thus achieving the advantage (1).

The valve opening point data may be provided also in other forms as described below.

Data containing the valve opening point data and any characteristic data of the electronic expansion valve 30 other than the valve opening point data (for example, data representing the leak flow rate, data representing the flow rate at the full opening degree, or data representing the point of inflection of the flow rate curve) may be integrated as a single code. In this case, when the barcode 63 corresponding to the code is read out, a predetermined decoding program is used to separate the valve opening point data and various types of characteristic data other than the valve opening point data from one another.

In the illustrated embodiment, the pulse number at the time when the gas flow rate is equal to the set value (for example, the maximum allowable value of the leak flow rate) is memorized as the valve opening point data (as the measured value of the valve opening point). However, the valve opening point data may be defined in any other suitable manner. For example, the initial point of inflection of the flow rate curve at the time when the pulse number is gradually increased from 0 may be memorized as the valve opening point data. Also in this configuration, the above-described advantage (1) is achieved.

In this case, the electronic expansion valve 30 is configured in the manner described below.

An electronic expansion valve 30 including a first refrigerant pipe 31, a second refrigerant pipe 32, a valve body 33 having a valve chamber 37 connected to the first refrigerant pipe 31 and a valve hole 34 connecting the valve chamber 37 to the second refrigerant pipe 32, a valve member 40 having a valve portion 43 inserted into the valve hole 34 of the valve body 33, the valve member 40 being movable to selectively open and close the valve hole 34 of the valve body 33 by means of the valve portion 43, the valve member 40 being configured such that, when the valve member 40 moves, the distance between the inner wall surface of the valve hole 34 of the valve body 33 and the valve portion 43 of the valve member 40 changes, and a stepper motor 50, the stepper motor 50 moving the valve member 40 in correspondence with a pulse number input to the stepper motor 50, the electronic expansion valve 30 being characterized in that a valve opening point is set based on the pulse number of the stepper motor 50 at the time when the change rate of the flow rate of the fluid flowing in the valve hole 34 with respect to the pulse number starts to increase and that the pulse number corresponding to the valve opening point is measured in a process of manufacturing the electronic expansion valve 30, an identifier being provided in correspondence with characteristic data of the electronic expansion valve 30 including the measured pulse number. This configuration also ensures an advantage similar to the advantage (1). Specifically, the time when the change rate of the flow rate of the fluid flowing in the valve hole 34 with respect to the pulse number starts to increase refers to the initial point of inflection of the flow rate curve at the time when the pulse number is gradually increased from 0.

DESCRIPTION OF THE REFERENCE NUMERALS

1 . . . air conditioner, 30 . . . electronic expansion valve, 31 . . . first refrigerant pipe, 32 . . . second refrigerant pipe, 33 . . . valve body, 34 . . . valve hole, 37 . . . valve chamber, 40 . . . valve member, 43 . . . valve portion, 50 . . . stepper motor, 63 . . . barcode (identifier)

The invention claimed is:

1. An electronic expansion valve comprising:
a first refrigerant pipe;
a second refrigerant pipe;
a valve body having a valve chamber connected to the first refrigerant pipe and a valve hole connecting the valve chamber to the second refrigerant pipe;
a valve member having a valve portion inserted into the valve hole of the valve body, wherein the valve member is movable to selectively open and close the valve hole of the valve body with the valve portion, and the valve member is configured such that, when the valve member moves, the distance between an inner wall surface of the valve hole of the valve body and the valve portion of the valve member changes; and
a stepper motor that moves the valve member in accordance with a pulse number input to the stepper motor,
wherein an identifier is provided that corresponds to characteristic data of the electronic expansion valve containing a pulse number corresponding to a valve opening point measured in a process of manufacturing the electronic expansion valve,
wherein the valve opening point is set based on the pulse number of the stepper motor at the time when the flow rate of fluid flowing through the valve hole is equal to a set value.

2. The electronic expansion valve according to claim 1, wherein the set value is greater than or equal to a maximum allowable value of the flow rate of the fluid that is allowed to pass through the second refrigerant pipe at the time when the valve hole of the valve body is closed by the valve portion.

3. An air conditioner comprising:
an electronic expansion valve according to claim 2, wherein
the valve opening point of the electronic expansion valve is stored, and
the electronic expansion valve is controlled based on the valve opening point.

4. An air conditioner comprising:
an electronic expansion valve according to claim 1, wherein
the valve opening point of the electronic expansion valve is stored, and
the electronic expansion valve is controlled based on the valve opening point.

* * * * *

UNITED STATES PATENT AND TRADEMARK OFFICE
CERTIFICATE OF CORRECTION

PATENT NO.         : 9,310,114 B2
APPLICATION NO.    : 14/368024
DATED              : April 12, 2016
INVENTOR(S)        : Shigetaka Wakisaka et al.

Page 1 of 1

It is certified that error appears in the above-identified patent and that said Letters Patent is hereby corrected as shown below:

ON THE TITLE PAGE:

At item (73), Assignee, change "Daiken Industries, Ltd., Osaka (JP)" to --Daikin Industries, Ltd., Osaka (JP)--.

Signed and Sealed this
Fourteenth Day of June, 2016

Michelle K. Lee
*Director of the United States Patent and Trademark Office*